United States Patent [19]

Dano

[11] 4,386,906

[45] Jun. 7, 1983

[54] METHOD FOR BURNING GRANULAR OR PULVEROUS MATERIALS AND KILN PLANT THEREOF

[75] Inventor: Tage H. Danø, Copenhagen, Denmark

[73] Assignee: F. L. Smidth & Co., Cresskill, N.J.

[21] Appl. No.: 301,407

[22] Filed: Sep. 11, 1981

[30] Foreign Application Priority Data

Sep. 22, 1980 [GB] United Kingdom ................. 8030508

[51] Int. Cl.[3] ......................... F27B 15/00; F27B 7/02; C04B 7/02

[52] U.S. Cl. ....................................... 432/14; 106/100; 432/106

[58] Field of Search .................... 432/14, 106; 106/100

[56] References Cited

U.S. PATENT DOCUMENTS 3,869,248 3/1975 Hirai et al. ............................ 432/14
4,183,762 1/1980 Deussner ............................. 106/100

FOREIGN PATENT DOCUMENTS 1406965 11/1973 United Kingdom .
1433109 4/1974 United Kingdom .
1463124 6/1974 United Kingdom .
1478246 10/1975 United Kingdom .
1441733 7/1976 United Kingdom ................ 432/106

*Primary Examiner*—John J. Camby

*Attorney, Agent, or Firm*—Pennie & Edmonds

[57] ABSTRACT

A kiln plant for burning raw materials such as cement raw materials and the like includes a single-string, multi-stage suspension preheater, a suspension precalciner, a rotary kiln and a cooler. The single-string preheater includes at least a lowermost preheater stage and a penultimate preheater stage each having a gas flow inlet and outlet. The precalciner gas outlet is coupled to the gas inlet of the penultimate preheater stage. The gas outlet of the lowermost preheater stage is also coupled to the gas inlet of the penultimate preheater stage. The materials are precalcined in the precalciner solely by means of spent cooler air from the cooler while the materials are preheated in the lowermost preheater stage solely by means of kiln exhaust gases. The pressure drops arising in the two gas flows through the precalciner and the lowermost preheater stage are equalized before the union of the two gases flows entering the gas inlet of the penultimate preheater stage. The equalization of the pressure drops in the two gas flows is provided by a movable damper mounted in the respective gas flow duct before the juncture in the duct which permits the union of the two gas flows. Preferably, the two gas flows are equalized so that the pressure drop across the precalciner is of the order of twice the pressure drop through the kiln and lowermost preheater stage. A method of practicing the present invention is also disclosed.

12 Claims, 3 Drawing Figures

METHOD FOR BURNING GRANULAR OR PULVEROUS MATERIALS AND KILN PLANT THEREOF

TECHNICAL FIELD

The present invention is directed to plants for burning granular or pulverulent material, particularly for burning cement raw materials to cement clinker.

BACKGROUND ART

Typically plants for burning granular materials include a preheater with associated precalciner, a kiln, e.g., a rotary kiln, and a cooler for cooling the burnt material by means of air subsequently utilized as combustion air.

Various constructions of such plants for burning and sintering of ores, lime and cement raw materials are known. Most frequently the preheater includes a string of cyclones through which the raw material passes in one direction from the inlet to the outlet in a heat exchange process with the exhaust gas from the rotary kiln passing in the opposite direction through the preheater to a dust precipitator, e.g., an electrostatic precipitator, positioned after the preheater and before a chimney.

Coolers for cooling the material burnt in the rotary kiln by means of cooling air are likewise well known, for instance in the form of a planetary cooler associated with the rotary kiln or of a stationary grate cooler into which the rotary kiln discharges the hot material.

The air utilized in the cooler is, through the heat exchange in the cooler, brought to a temperature of between 600° and 900° depending on the type of cooler, so that the heated cooling air has a high heat content, which it is advantageous to recover. The heated cooling air is therefore usually utilized partly as secondary combustion air in the burning process performed in the rotary kiln, and partly as combustion air in the precalciner to which it may be fed through a separate pipe directly from the cooler. Further, the heated spent cooling air together with exhaust gases from the kiln and/or the precalciner may be used in the preheater for preheating the treated material. Such plants are known, for instance, from British patent specification Nos. 1,433,109; 1,463,124 and 1,478,246.

Known single string preheater systems with associated precalciners work with two calcination stages in series, a precalcination stage and a postcalcination stage. Of these, one, often in the form of the lowermost riser pipe, is in combination with the lowermost preheater stage. Combustion air may be fed separately to each of the two calcination stages either as spent cooling air or in kiln exhaust gas. The use of two calcination stages is intended to ensure the best possible precalcination but includes the drawback of a more complicated construction and regulation system. Such systems are known, for instance, from British patent specification No. 1,406,965 and U.S. Pat. No. 4,183,762.

A single string preheater-precalciner of the hitherto known type does not therefore offer the same advantageous technical and economical working conditions as a multi-string preheater where the precalciner forms part of a separate calciner string and is fed entirely with spent cooling air, while the preheater string(s) are fed with kiln exhaust gas, and where an optimal control of the ratio of air drawn through the strings is obtained by fans in each string. Contrary hereto, the presence of the precalciner as an integral part of the single string preheater has made it difficult to avoid compromising the air-fuel balance both in the kiln and in the appertaining calciner due to the problems of regulating the two burning processes together and obtaining, at the same time, an optimal precalcination of the treated material.

I have invented an apparatus for burning granular or pulverulent materials in a kiln plant with a single string suspension preheater-precalciner which is not encumbered with the above disadvantages and which, in addition, offers the favorable working conditions of multi-string preheaters, but is considerably less expensive to construct, work, and maintain and far more space saving than the latter.

DISCLOSURE OF INVENTION

The present invention relates to a method for burning granular raw materials in a plant comprising a single-string, multi-stage suspension preheater including at least a first preheater stage and a second preheater stage each having a gas inlet and a gas outlet, a suspension precalciner having a gas outlet and being coupled to the single-string preheater, a kiln for burning the materials treated in the preheater and the precalciner, a cooler coupled to the kiln for cooling the burnt material, the cooler also coupled to the precalciner so as to permit at least a portion of the spent cooling air to be admitted to the precalciner, wherein the precalciner gas outlet is coupled to the gas inlet of the second preheater stage, the gas outlet of the first preheater stage also being coupled to the gas inlet of the second preheater stage. The method comprises feeding the treated materials from the first preheater stage to the precalciner and then to the kiln, precalcining the materials in the precalciner solely by means of spent cooler air fed to the precalciner from the cooler, preheating the materials in the first preheater stage solely with kiln exhaust gases, and equalizing the pressure drops arising in the two gas flows through the precalciner and the first preheater before the union of the two gas flows for preheating in the remaining portion of the preheater.

The present invention also relates to a kiln plant for burning granular raw materials comprising a single-string, multi-stage suspension preheater including at least a first preheater stage and a second preheater stage each having a gas inlet and a gas outlet, a suspension precalciner having a gas outlet and being coupled to the single-string preheater, a kiln for burning the materials treated in the prehearter and the precalciner, a cooler coupled to the kiln for cooling the burned material, the cooler also being coupled to the precalciner so as to permit at least a portion of the spent cooling air to be admitted to the precalciner, the precalciner gas outlet being coupled to the gas inlet of the second preheater stage, the gas outlet of the first preheater stage also being coupled to the gas inlet of the second preheater stage, means for feeding the treated materials from the first preheater stage to the precalciner and then to the kiln, the materials in the precalciner being precalcined solely by means of spent cooler air fed to the precalciner from the cooler, the materials in the first preheater stage being preheated solely with kiln exhaust gases, and means for equalizing the pressure drops arising in the two gas flows through the precalciner and the first preheater before the union of the two gas flows for preheating in the remaining portion of the preheater.

In one preferred embodiment, a kiln plant for burning granular or pulverulent raw material comprises a kiln, a single string multi stage suspension preheater with an associated suspension precalciner for pretreating material prior to burning of the material in the kiln, and a cooler coupled to the kiln for cooling the burnt material; a lowermost riser pipe is arranged to convey kiln exhaust gas to a gas inlet of the lowermost preheater stage; a gas outlet of the lowermost preheater stage is connected via a gas duct to the gas inlet of the penultimate preheater stage; a conduit conveys spent cooling air to the precalciner to provide substantially the entire combustion air supply to the precalciner; a precalciner exhaust gas outlet is connected to a separator for separating the precalcined material and for feeding the separated material into the kiln; the precalciner exhaust gas outlet is also connected to the gas duct whereby both the kiln exhaust gas and the precalciner exhaust gas combine in the gas duct and pass together up through the penultimate and any higher stages of the preheater; and a throttle is provided in the gas duct upstream of the connection from the precalciner exhaust gas outlet whereby the gas flows through the lowermost riser pipe and lowermost preheater stage and through the precalciner respectively are controlled to provide the desired combustion conditions in the precalciner.

The two gas flows, the one from the cooler through the precalciner, and the other from the kiln through the lowermost preheater stage, would inevitably unite under the same pressure before being fed into the penultimate preheater stage. However the provision of the throttle in the gas duct upstream of the point where the two flows unite, imposes an extra pressure drop in the path of the kiln exhaust gas and compensates for the fact that the pressure drop across the precalciner should preferably be of the order of twice that otherwise provided through the kiln and lowermost preheater stage. The united gas flows can then pass up through the upper parts of the single preheater string together.

The positioning of the throttle in the gas duct downstream of the lowermost preheater stage is the most advantageous position as the kiln exhaust gas passing this point is significantly cooler than for example that passing up the riser pipe between the kiln and lowermost preheater stage. The throttle will therefore suffer minimal thermal stress. This is particularly important if the throttle is an adjustable damper or valve involving moving parts.

The uniting of the two gas flows may take place in a number of different ways. For example a gas outlet from the calciner separator may lead into the gas duct which in turn leads directly from the lowermost to the penultimate preheater stages. Alternatively, the gas duct may pass from the lowermost preheater stage, through the top of the precalciner and thence into the calciner separator and onto the penultimate preheater stage. As a further alternative, the gas duct may lead from the lowermost preheater stage, through the calciner separator and to the penultimate preheater stage.

To avoid overloading of the material feed from the penultimate preheater stage to the lowermost riser pipe and hence into the lowermost preheater stage, the plane may further include means for leading the separated material stream, or at least part of it, from the penultimate preheater stage directly to the precalciner. By use of a splitting gate at the material outlet of this preheater stage, it may thus be possible to regulate the material feed to the lowermost riser pipe in accordance with the suspension abilities of the exhaust gases in that pipe.

BRIEF DESCRIPTION OF THE DRAWINGS

The present invention is described in greater detail below with reference to the drawings wherein.

BEST MODE FOR CARRYING OUT THE INVENTION

Figure 1:
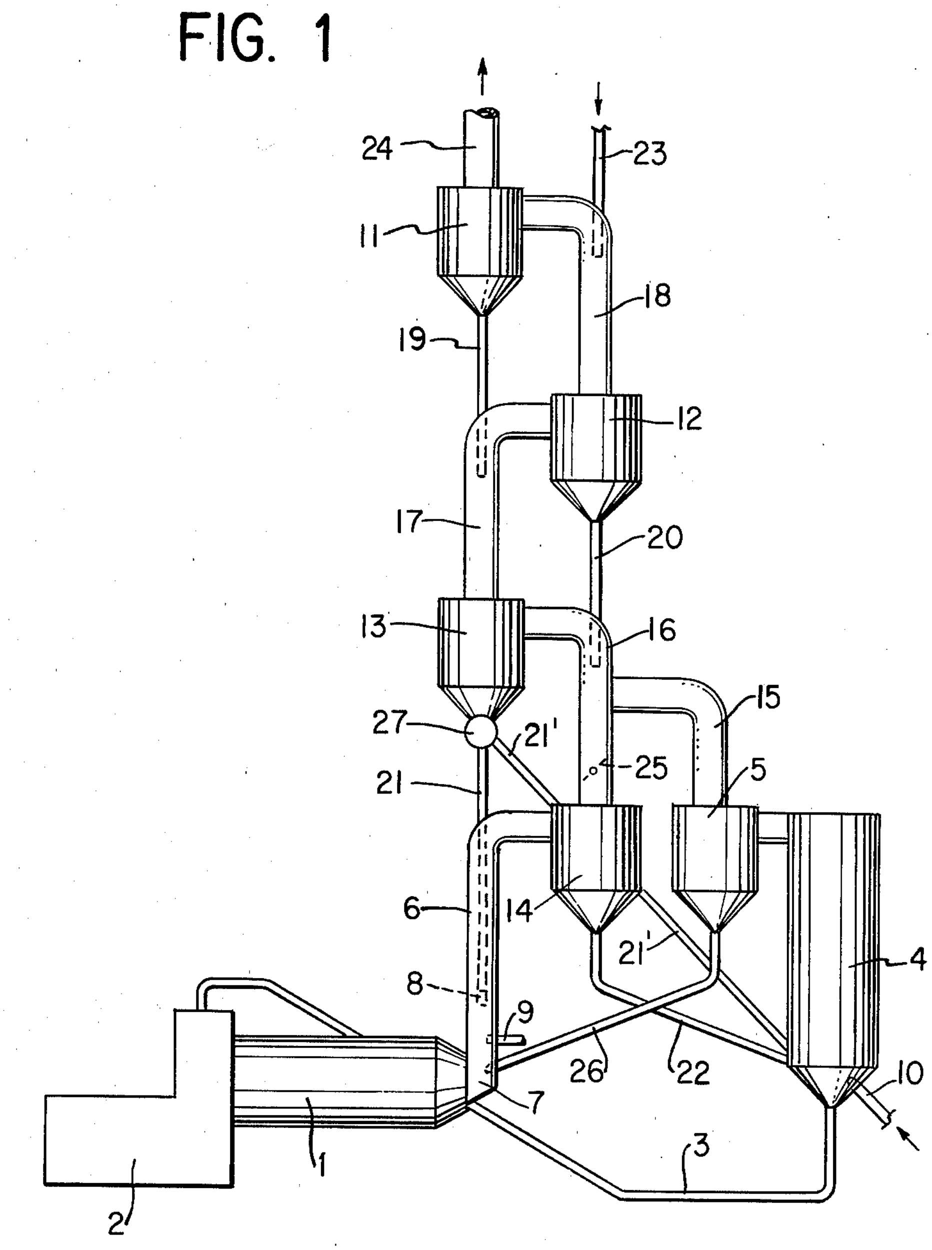
FIG. 1 is a side elevational view of a preferred embodiment of a plant according to the present invention wherein the precalciner exhaust gas is connected to the conventional riser pipe between the lowermost and penultimate preheater stages.

Referring to the drawings, similar units or elements in the different FIGS. are identified by like reference numerals. The plant according to the present invention has a rotary kiln 1, a grate cooler 2, and a conduit pipe 3 leading part of the spent cooler air from the cooler to a suspension precalciner 4 with a separator 5, 5', 5'' shown in FIGS. 1, 2 and 3, respectively, for separating the precalcined material from the suspension. A riser pipe 15 connects the separators 5, 5', 5'' with a penultimate preheater stage 13. A riser pipe 6 connects the kiln 1 with a suspension cyclone preheater with four suspension stages 11, 12, 13 and 14, connected to one another by riser pipes 16, 17 and 18. Pulverized or granular raw material is fed to the preheater through an inlet 23. While being preheated in suspension, the material passes down through pipes 19, 20 and 21 from stage to stage and eventually reaches the riser pipe 6. The exhaust gas leaves the preheater through a pipe 24 leading to a filter (not shown). The material outlet 8 of the pipe 21, feeding raw material from the penultimate preheater stage 13 to the riser pipe 6, is positioned near to the kiln inlet 7.

The riser pipe 6 may have a burner 9 in the lowermost part of the pipe for supplementing the precalcining conditions in the riser pipe. Preheated raw material separated from the suspension in the lowermost preheater stage 14 is fed to the suspension precalciner 4 through a pipe 22. The precalciner is fired by means of a burner 10, and precalcined material separated from the suspension in the separators 5, 5', 5'' is led to the kiln inlet through a pipe 26.

In order to avoid the overloading of preheated raw material from stage 13 into the riser pipe 6, which may cause difficulties with regard to suspending the raw materials in the kiln exhaust gas, the plant may have an alternative pipe 21' making it possible via a splitting gate 27 placed at the material outlet of stage 13 to lead part of the material stream directly to the precalciner 4.

Figure 2:
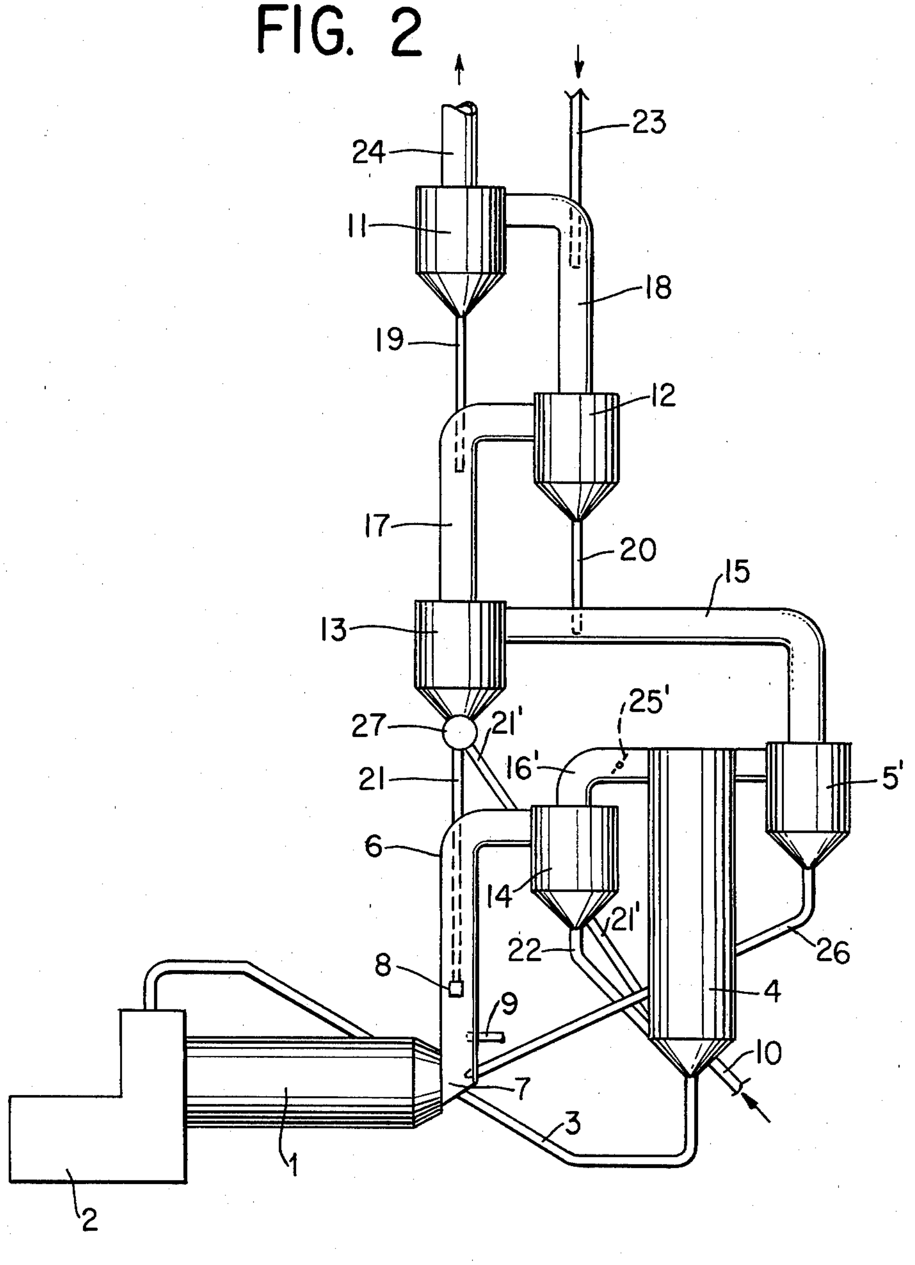
FIG. 2 is a side elevational view of an alternative embodiment of a plant according to the present invention wherein the kiln exhaust gas suspension from the lowermost preheater passes through the top of the precalciner; and, FIG. 3 is a side elevational view of a second alternate embodiment of a plant according to the present invention wherein the kiln exhaust gas supension is led to a separator common to the kiln and precalciner exhaust gas suspensions.
Figure 3:
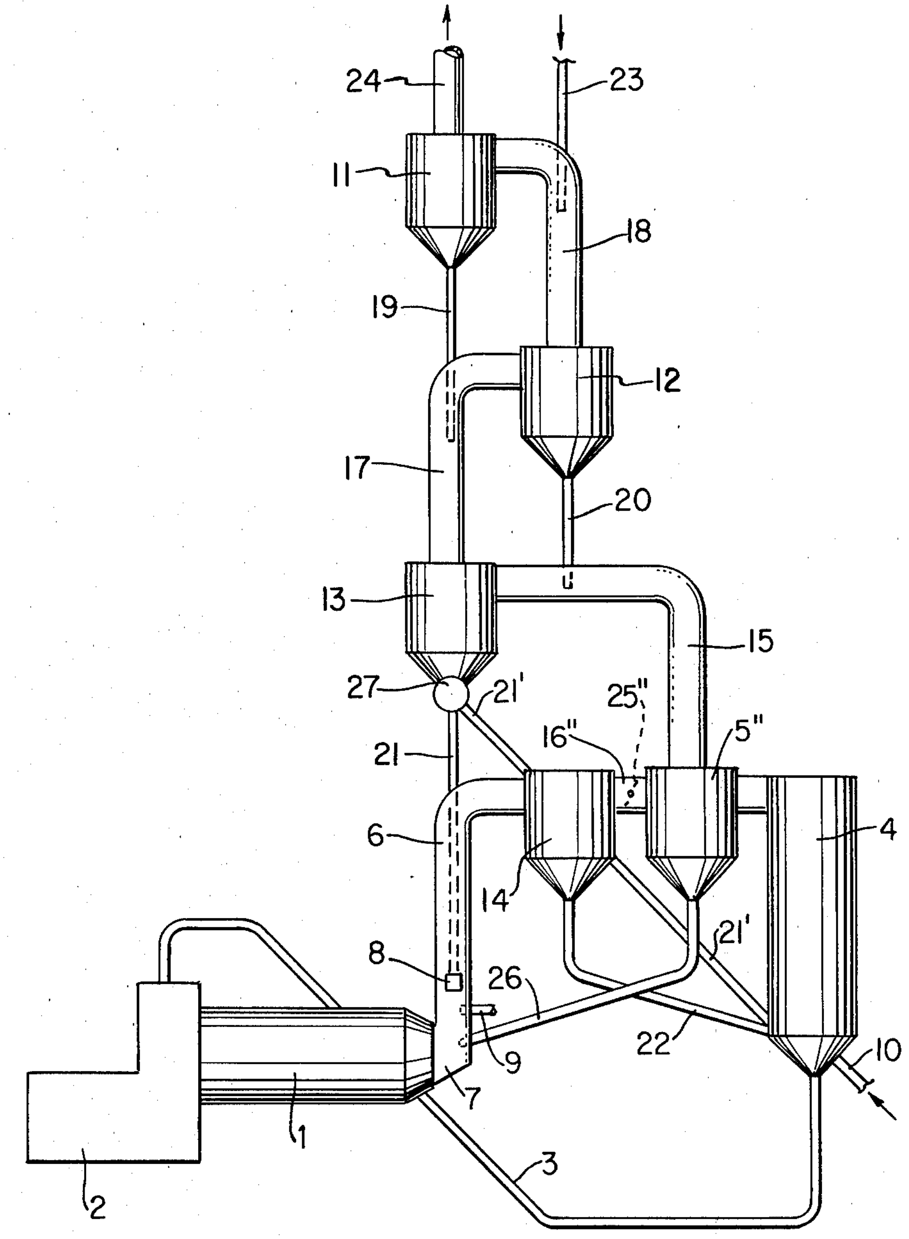

Referring to FIG. 1, riser pipe 16 forms a gas duct connecting preheater stage 14 with stage 13. In FIG. 2, the corresponding riser pipe 16' forms part of a gas duct leading from the preheater stage 14, through the top of the precalciner 4 and separator 5', and through the pipe 15 to the preheater stage 13. Referring to FIG. 3, pipe 16″ forms part of a gas duct leading through the top of the separator 5″ and the pipe 15 to connect the preheater stage 14 with the stage 13. In each case, as illustrated in FIGS. 1–3, pipes 16, 16′ and 16″ are provided with movable dampers or valves 25, 25′, 25‴ respectively, positioned in the pipe immediately upstream of the meeting point of the kiln exhaust gas and precalciner exhaust gas. This damper or valve allows for regulation of the pressure over the lowermost riser pipe 6 and preheater stage 14, so that the kiln exhaust gas meets the precalciner gas under a pressure which is appropriate to provide a satisfactory pressure drop across the precalciner 4 for satisfactory operation of the precalciner.

I claim:

1. Method for burning granular raw materials in a plant comprising a single-string, multi-stage suspension preheater including at least a first preheater stage and at least a second preheater stage each having a gas inlet and a gas outlet, a suspension precalciner having a gas inlet and a gas outlet, the gas outlet being coupled to the single-string preheater, a kiln for burning the materials treated in the preheater and the precalciner, the kiln being coupled to the gas inlet of the first preheater stage, a cooler being coupled solely to the kiln for cooling the burnt material and also to the gas inlet of the precalciner so as to permit at least a portion of the spent cooling air to be admitted to the precalciner, wherein the precalciner gas outlet is coupled to the gas inlet of the second preheater stage, means for coupling the gas outlet of the first preheater stage to the gas inlet of the second preheater stage, comprising feeding the treated materials from the first preheater stage to the precalciner and then to the kiln, precalcining the materials in the precalciner solely by means of spent cooler air fed to the precalciner from the cooler, preheating the materials in the first preheater stage solely with kiln exhaust gases, and equalizing the pressure drops arising in the two gas flows through the precalciner and the first preheater stage by throtteling means positioned in said coupling means before the union of the two gas flows for preheating in the remaining portion of the preheater.

2. Method for burning granular or pulverous raw materials such as cement raw materials in a plant comprising a single-string, multi-stage suspension preheater including at least a lowermost preheater stage and a penultimate preheater stage each having a gas inlet and a gas outlet, a suspension precalciner having a gas inlet and a gas outlet, the gas outlet being coupled to the single-string preheater, a kiln for burning the materials treated in the preheater and the precalciner, the kiln being coupled to the gas inlet of the first preheater stage, a cooler being coupled solely to the kiln for cooling the burnt material and also to the gas inlet of the precalciner so as to permit at least a portion of the spent cooling air to be admitted to the precalciner, a separator for separating precalcined material, wherein the precalciner gas outlet is coupled by means of the separator to the gas inlet of the penultimate preheater stage, a kiln gas duct coupling the gas outlet of the lowermost preheater stage to the gas inlet of the penultimate preheater stage, comprising feeding the treated materials from the lowermost preheater stage to the precalciner and then to the kiln, precalcining the materials in the precalciner solely by means of spent cooler air fed to the precalciner from the cooler, preheating the materials in the lowermost preheater stage solely with kiln exhaust gases, and equalizing the pressure drops arising in the two gas flows through the precalciner and the lowermost preheater by throttling means disposed in the kiln gas duct at a position before the union of the two gas flows as a common gas flow for preheating in the remaining portion of the preheater.

3. Method for burning granular or pulverous raw materials, for instance cement raw materials in a plant comprising a single-string, multi-stage suspension preheater with an adjoined suspension precalciner coupled before a kiln, a kiln for burning (sintering) the treated materials and a cooler coupled after the kiln for cooling the burnt material, and where an amount of spent cooling air as atmospheric air is led to the precalciner as the sole and entire amount of combustion air for same, and where the calciner gas outlet, via a separator for separating precalcined material, is connected to the gas inlet of the penultimate preheater stage, and where the gas outlet of the lowermost preheater stage is connected by a kiln gas duct to same gas inlet of the penultimate preheater stage, characterized in that the treated raw materials from the lowermost preheater stage are fed to the precalcination stage and hence to the kiln, that the precalcination is carried through entirely and solely by means of combustion air fed to the precalciner as atmospheric air in the form of preheated spent cooler air, that the lowermost preheater stage is fed entirely and solely with kiln exhaust gases for the preheating of the treated materials and in that the different pressure drops arising in the two gas flows during their passages through the precalcination stage and the lowermost preheater stage respectively are equalized by means of throttling or damping means disposed in the kiln gas duct at a position between the lowermost and penultimate preheater stages and before the uniting of the two gas flows as a common gas flow for preheating in the remaining portion of the preheater.

4. A kiln plant for burning granular raw materials comprising a single-string, multi-stage suspension preheater including at least a first preheater stage and at least a second preheater stage each having a gas inlet and a gas outlet, a suspension precalciner having a gas inlet and a gas outlet, the gas outlet being coupled to the single-string preheater, a kiln for burning the materials treated in the preheater and the precalciner, the kiln being coupled to the gas inlet of the first preheater stage, a cooler being coupled solely to the kiln for cooling the burnt material and also to the gas inlet of the precalciner so as to permit at least a portion of the spent cooling air to be admitted to the precalciner, the precalciner gas outlet being coupled to the gas inlet of the second preheater stage, means for coupling the gas outlet of the first preheater stage to the gas inlet of the second preheater stage, means for feeding the treated materials from the first preheater stage to the precalciner and then to the kiln such that the materials in the precalciner are precalcined solely by means of spent cooler air fed to the precalciner from the cooler and such that the materials in the first preheater stage are preheated solely with the kiln exhaust gases, and means for equalizing the pressure drops arising in the two gas flows through the precalciner and the first preheater stage by throtteling means positioned in said coupling means and before the union of the two gas flows for preheating in the remaining portion of the preheater.

5. A kiln plant for burning granular or pulverous raw materials such as cement raw materials which comprises a single-string, multi-stage suspension preheater including at least a lowermost preheater stage and at least a penultimate preheater stage each having a gas inlet and a gas outlet, a suspension precalciner having a gas inlet and a gas outlet, the gas outlet being coupled to the single-string preheater, a kiln for burning the materials treated in the preheater and the precalciner, the kiln being coupled to the gas inlet of the first preheater stage, a cooler being coupled solely to the kiln for cooling the burnt material and also to the gas inlet of the precalciner so as to permit at least a portion of the spent cooling air to be admitted to the precalciner, a separator for separating precalcined material, the precalciner gas outlet being coupled by means of the separator to the gas inlet of the penultimate preheater stage, a kiln gas duct coupling the gas outlet of the lowermost preheater stage to the gas inlet of the penultimate preheater stage, means for feeding the treated materials from the lowermost preheater stage to the precalciner and then to the kiln such that the materials are precalcined in the precalciner solely by means of spent cooler air fed to the precalciner from the cooler and such that the materials are preheated in the lowermost preheater stage solely with the kiln exhaust gases, and means for equalizing the pressure drops arising in the two gas flows through the precalciner and the lowermost preheater stage by throtteling means disposed in the kiln gas duct at a position before the union of the two gas flows as a common gas flow for preheating in the remaining portion of the preheater.

6. The kiln plant according to claim 5 wherein the means for equalizing the pressure drop comprises means for regulating and controlling the pressure drop over the lowermost preheater stage.

7. The kiln plant according to claim 6 wherein said regulating and controlling means is mounted in the kiln gas duct between the lowermost and the penultimate preheater stages.

8. The kiln plant according to claim 7 wherein the regulating and controlling means in the kiln gas duct between the lowermost and penultimate preheater stages is in the form of a movable damper mounted in the duct below or before the point where the gas flow from the lowermost preheater stage unites with the gas flow from the precalciner.

9. The kiln plant according to claim 5 wherein the gas outlet of the lowermost preheater stage is connected to the gas outlet of the precalciner proper.

10. The kiln plant according to claim 5 wherein the gas outlet of the lowermost preheater stage is connected to the separator also separating precalcined material from the precalcination suspension.

11. The kiln plant according to any of claims 5–10 comprising a lowermost riser pipe coupling the kiln and the lowermost preheater stage and a first pipe connecting the material outlet of the penultimate preheater stage and the lowermost riser pipe for feeding preheated material to the lowermost riser pipe, and a second pipe connecting the material outlet of the penultimate preheater stage to a material inlet of the precalciner, and means disposed adjacent the material outlet of the penultimate preheater stage for selectively regulating the material flow from the material outlet of the penultimate preheater stage between the first pipe and the second pipe.

12. The kiln plant according to claim 11 wherein said means for selectively regulating the material flow from the penultimate preheater stage between the first pipe and the second pipe is in the form of a splitting gate.

* * * * *

UNITED STATES PATENT AND TRADEMARK OFFICE

CERTIFICATE OF CORRECTION

PATENT NO. : 4,386,906

DATED : June 7, 1983

INVENTOR(S) : Tage Halfdan Dano

It is certified that error appears in the above-identified patent and that said Letters Patent is hereby corrected as shown below:

The title should read METHOD FOR BURNING GRANULAR OR PULVEROUS MATERIALS AND KILN PLANT THEREFOR.

In Column 2, line 51, "prehearter" should be --preheater--.

In Column 3, line 3, "single string multi stage" should be --single-string multi-stage--.

In Column 3, line 62, "plane" should be --plant--.

In Column 5, line 39, "throtteling" should be --throttling--.

In Column 6, line 61, "throtteling" should be --throttling--.

In Column 7, line 25, "throtteling" should be --throttling--.

Signed and Sealed this

*Twenty-fifth* Day of *October 1983*

[SEAL]

*Attest:*

GERALD J. MOSSINGHOFF

*Attesting Officer* *Commissioner of Patents and Trademarks*